United States Patent [19]

James et al.

[11] 4,389,339

[45] Jun. 21, 1983

[54] PROCESS FOR MAKING A COBALT OXIDE CATALYST

[75] Inventors: Leonard E. James, Richmond; Lamberto Crescentini; William B. Fisher, both of Chester, all of Va.

[73] Assignee: Allied Corporation, Morris Township, Morris County, N.J.

[21] Appl. No.: 353,687

[22] Filed: Mar. 1, 1982

Related U.S. Application Data

[60] Division of Ser. No. 87,593, Oct. 22, 1979, abandoned, which is a continuation-in-part of Ser. No. 926,178, Jul. 20, 1978, abandoned.

[51] Int. Cl.$^3$ .............................................. B01J 23/74
[52] U.S. Cl. .................................... 252/472; 423/392; 423/404
[58] Field of Search ................. 252/472; 423/392, 404

[56] References Cited

U.S. PATENT DOCUMENTS 1,937,689  12/1933  Frazer .............................. 252/472 X

FOREIGN PATENT DOCUMENTS 1342577  1/1974  United Kingdom ................ 252/472

*Primary Examiner*—W. J. Shine
*Attorney, Agent, or Firm*—Richard A. Anderson

[57] ABSTRACT

A process for preparing an improved cobalt oxide catalyst for ammonia oxidation comprising decomposing a cobalt compound such as basic cobalt carbonate by heating to form cobalt oxide, then saturating the cobalt oxide with cobalt nitrate solution and reheating to give an active, durable cobalt oxide catalyst. In ammonia oxidation processes, the durable catalyst of this invention has a long catalyst life and gives improved conversion of ammonia to nitric oxide. Additionally, the catalyst of this invention is capable of performing at higher operating rates than known catalysts. Optimum yields are obtained when the catalyst is prepared from compounds derived from electrolytic grade cobalt.

10 Claims, No Drawings

PROCESS FOR MAKING A COBALT OXIDE CATALYST

CROSS-REFERENCE TO RELATED APPLICATION

This is a division, of application Ser. No. 87,593, filed Oct. 22, 1979, now abandoned, which was a continuation-in-part of application Ser. No. 926,178 filed July 20, 1978, now abandoned.

BACKGROUND OF THE INVENTION

This invention relates to a cobalt oxide catalyst particularly suitable for the oxidation of ammonia to nitric oxide and to a process for producing said catalyst.

Although it has long been known that cobalt oxide is effective in ammonia oxidation, industrial processes for the manufacture of nitrogen oxides have generally used a platinum-based catalyst such as platinum-rhodium, usually in the form of metal gauze. This is expensive in initial cost and also in operating cost because metal is lost from the catalyst and is not recovered completely from the reaction gases.

One problem in the use of cobalt oxide catalyst is to ensure high activity coupled with adequate resistance to disintegration of the catalyst particles at the high temperature of the oxidation, particularly when the catalyst bed is raked to shift the catalyst particles to present fresh surfaces. We have now discovered a method of making a highly active, particulate cobalt oxide catalyst which has a much lower incidence of disintegration during ammonia oxidation. Moreover, with use of the preferred catalyst derived from electrolytic grade cobalt, a conversion efficiency of ammonia to nitric oxide of up to 99.4 percent has been obtained.

SUMMARY OF THE INVENTION

According to the present invention there is provided a catalyst consisting essentially of cobalt oxide of the formula $Co_3O_4$ having a specific surface area of at least 0.1 m$^2$/g and a bulk density of 1.6 to 1.8 g/ml. The catalyst is preferably in the form of irregular particles of length and mean diameter about equal and in the range 1.4 to 4.0 mm. and having a mean crushing strength of 1,800 to 5,500 grams per particle. Preferably, the catalyst contains 48.0 to 48.9 percent trivalent cobalt.

The present invention further provides a process for making an improved cobalt oxide catalyst comprising heating a substance from which cobalt oxide can be formed to a first elevated temperature sufficient to decompose said substance and produce a first porous mass of cobalt oxide, saturating the porous mass with a concentrated aqueous solution of cobalt nitrate, heating the resulting saturated mass at a second elevated temperature for a period of time sufficient to complete the reaction and produce a second porous mass of cobalt oxide having improved crushing strength, and grinding the second porous mass to produce a particulate cobalt oxide catalyst having high activity and improved resistance to disintegration during ammonia oxidation.

Preferably, the cobalt compounds used in the process of this invention are derived from electrolytic grade cobalt which is particularly low in iron content, iron being detrimental to the activity of the catalyst. Electrolytic grade cobalt normally contains less than 100 ppm iron. The substance from which the cobalt oxide is formed in the first decomposition step of the process is preferably cobaltous nitrate or basic cobaltous carbonate; however, an oxalate or hydroxide may be substituted, if desired. The concentrated aqueous solution of cobalt nitrate used to saturate the first porous mass of cobalt oxide contains at least about 8 percent cobalt, preferably about 10 to 15 percent cobalt. A hot solution of the cobalt nitrate is desirably applied, thereby allowing use of a relatively more concentrated solution.

The catalyst of the present invention comprises at least about 95 percent cobalt oxide calculated as $Co_3O_4$. If other constituents are present, these can be, for example, oxides of chromium or aluminum, which do not significantly impair the effectiveness of the catalyst. It is preferred not to have more than traces of iron compounds present.

The first decomposition step of the process is carried out at a temperature in the range of 200° C. to 800° C., preferably 400° C. to 600° C. The second stage of elevated temperature is in the range 350° C. to 800° C., preferably 450° C. to 750° C. The temperature at which the catalyst is heated should not exceed the temperature beyond which the catalytically active cobalt oxide, $Co_3O_4$, is converted into the inactive cobalt oxide, $CoO$, and this temperature is about 950° C.

The invention provides also a process of oxidizing ammonia to nitric oxide in the presence of a catalyst produced by the method of the invention. For this process the temperature of the catalyst is preferably in the range 700° C. to 800° C., and the catalyst is fed with an ammonia-air mixture containing about 7.5 to 11 percent by volume of ammonia, at a linear velocity of at least about 60 cm. per second. The critical velocity, i.e., the gas velocity above which combustion is not sustained, is surprisingly high, e.g., 240 to 360 cm. per second, as demonstrated hereinafter in the specific examples. The catalyst prepared from basic cobalt carbonate and hardened with cobalt nitrate in accordance with the invention has a significantly higher critical velocity than a similar catalyst prepared entirely from cobalt nitrate in accordance with the invention. It has been found that the depth of the catalyst bed is preferably in the range 4 to 11 cm.

DESCRIPTION OF THE PREFERRED EMBODIMENT

The following examples serve to illustrate the present invention. These examples demonstrate that the cobalt oxide catalyst of the invention gives improved catalyst life and conversion of ammonia to nitric oxide. Additionally, the catalyst is capable of performing at higher linear velocities and higher production rates than cobalt oxide catalysts in current commercial use. In these examples, all parts and percentages are by weight unless otherwise indicated. The electrolytic grade cobalt used in the examples contains 40 ppm iron, whereas the metallurgical grade cobalt contains 1,500 ppm iron.

EXAMPLE 1

A concentrated cobalt nitrate solution is prepared by reacting 255 parts of electrolytic grade cobalt with 2,060 parts of 40 percent nitric acid. About 5 percent of the concentrated cobalt nitrate solution is reserved for later use in this example as described below. The remainder of the solution is reduced in volume by evaporation and transferred to an aluminum pan. The highly concentrated cobalt nitrate solution is heated in a furnace at 500° C. for 4 hours to form a first porous mass of cobalt oxide. The decomposition of the nitrate begins in solution and no crystals of cobalt nitrate are observed to form. This porous mass is cooled to ambient temperature and saturated with the portion of cobalt nitrate solution previously reserved. Then, the saturated mass is heated in the furnace at 500° C. for 4 hours to produce a second porous mass of cobalt oxide, consisting essentially of $Co_3O_4$ and containing 48.9 percent trivalent cobalt, $Co^{+3}$. This second porous mass of cobalt oxide is cooled to ambient temperature, ground, and screened to provide a particulate cobalt oxide catalyst having a specific surface area of 0.2 $m^2/g$ and a bulk density of 1.7 g./ml. The catalyst is in the form of irregular particles of length and mean diameter about equal and in the range 1.4 to 4.0 mm., said particles having a mean crushing strength of 4,200 grams per particle.

The particulate cobalt oxide catalyst thus prepared is tested in a bed about 4 cm. deep in a small ammonia oxidation plant. The inlet ammonia content is 7.5 to 9.5 percent by volume of the ammonia-air mixture fed, the pressure is atmospheric, the linear velocity of the gas is about 60 cm./second, and the catalyst temperature is 790° C. The yield of nitric oxide based on ammonia fed is 99.4 percent of theory in a two-day test. The linear gas velocity above which ammonia oxidation ceases, i.e., the critical velocity, is 330 cm. per second at 7.5 percent ammonia in the feed gas.

In another test on commercial scale, the catalyst gives an average yield of 94 percent when operated for 99 days, and the crushing strength of the catalyst is not significantly reduced during the test period.

EXAMPLE 2

The procedure of Example 1 is followed except that the cobalt metal used is metallurgical grade cobalt. When tested in the small ammonia oxidation plant, this catalyst gives a yield of 94 percent of theory based on ammonia fed. On commercial scale, the catalyst of this example gives an average yield of 91 percent when operated for 45 to 60 days.

EXAMPLE 3

A cobalt nitrate solution is prepared by reacting 125 parts of electrolytic grade cobalt with 1,125 parts of 40 percent nitric acid. About 33 percent of this solution is reserved for later use in this example. The remaining solution is mixed with 1,125 parts of 40 percent ammonium carbonate solution to form a precipitate of basic cobalt carbonate. The precipitate is separated from the solution by filtration, washed with water, dried, and placed in a furnace at 500° C. for 4 hours to form a first porous mass of cobalt oxide; this first porous mass of cobalt oxide is very soft and not suitable for use as a particulate catalyst. The first porous mass is cooled to ambient temperature and saturated with the portion of cobalt nitrate previously reserved. The resulting saturated mass is heated in the furnace at 500° C. for 4 hours to form a second porous of cobalt oxide, $Co_3O_4$, containing 48.9 percent trivalent cobalt. Surprisingly, this second porous mass is hard enough for use as a catalyst; it is cooled to ambient temperature, ground, and screened to provide a particulate cobalt oxide catalyst. The catalyst particles have a mean crushing strength of about 3,900 grams per particle. As in Example 1, the catalyst is tested in the small ammonia oxidation plant. The yield of nitric oxide is 99.3 percent of theory in a series of tests using an ammonia-air feed mixture containing 9.3 to 9.9 percent ammonia, by volume, and a linear gas velocity of about 60 to 230 cm. per second. For this catalyst, the critical velocity is surprisingly high, about 370 cm. per second at 7.5 volume percent ammonia in the feed gas.

EXAMPLE 4

The procedure of Example 3 is followed except that 50 percent instead of 33 percent of the cobalt nitrate solution is reserved for saturating the first porous mass of cobalt oxide. The product catalyst produced in this example is very similar to the catalyst produced in Example 3. However, it has an even higher critical velocity of greater than 410 cm. per second when tested in the small ammonia oxidation plant.

EXAMPLE 5

A critical particle size for the catalyst of this invention has been found. The catalyst of the prior art contained about 4 to 9 percent by weight of crushed particles which would pass through a 14 mesh screen (i.e., an ASTM standard screen containing 14 wires per inch). Surprisingly, omission of these fine particles does not significantly affect yield while significantly lowering the pressure drop across the bed. However, use of a coarse catalyst having about 50 percent by weight of the particles retained on 8 mesh screen adversely affects the critical velocity at which the reaction products can be passed over the catalyst. See Table 1.

The catalyst particles should all pass through 6 mesh screen, and essentially none should pass through a 14 mesh screen. Preferably, up to about 35 percent by weight is retained on 8 mesh screen, and up to about 63 percent by weight is retained on 10 mesh screen; and up to about 82 percent by weight is retained on 12 mesh screen. More preferably, from about 5 to 35 percent by weight is retained on 8 mesh screen; and from about 20 to 63 percent by weight is retained on 10 mesh screen; and from about 40 to 82 percent by weight is retained on 12 mesh screen.

To examine the effect of particle size distribution of the catalyst on bed pressure drop and oxidation performance (i.e., yield and critical velocity), the particle size distributions of the samples studied are shown in the following analysis. Sample No. 1 is a sample of prior art catalyst used. Sample Numbers 2–4 are samples prepared by mixing sieved fractions of prior art catalyst. Note that 4 to 9 percent of the prior art catalyst is −14 mesh.

Table 1 is a compilation of the pressure drop and performance of each catalyst. The pressure drop was measured at room temperature using a one-inch pipe containing a 4 inch deep bed at a 3.5 ft./second linear velocity. The yield was measured using 9.5 percent $NH_3$ in air at 3.5 ft./second linear velocity. Removal of the −14 mesh fraction reduces pressure drop without affecting yield in critical velocity. However, care must be exercised in increasing the particle size of the catalyst. Sample No. 2 where 50 percent of the catalyst is retained on an 8 mesh screen has an extremely low critical velocity.

Overall, the catalyst with uniform distribution (i.e., mass evenly distributed among all particle sizes) seems to perform best with regard to critical velocity without increasing ΔP or reducing yield.

TABLE 1

PRESSURE DROP AND PERFORMANCE OF CATALYSTS

| Sample No. | ΔP, In. H₂O | Yield, % | Critical Velocity**, Feet/Second |
|---|---|---|---|
| 1 | 29.9 | 98.4 | 7.0 |
| 2* | 15.5 | 98.9* | 2.0 |
| 3 | 16.4 | 100.0 | 7.0 |
| 4 | 15.4 | 97.6 | 8.0 |

*Yield run at 2.5 feet/second linear velocity. Reaction could not be sustained at 3.5 feet per second.
**Linear velocity at which reaction "blows out" at 7.5 percent NH₃ in air in a ½ inch reactor.

Following is an analysis of particle size of prior art catalysts:

| Sieve | Weight, Grams | Cumulative Weight, Gms. | % on Sieve | Cumulative, % |
|---|---|---|---|---|
| SAMPLE NO. 1 | | | | |
| 6 Mesh | 0 | 0 | 0 | 0 |
| 8 Mesh | 91.0 | 91.0 | 18.28 | 18.3 |
| 10 Mesh | 203.0 | 294.0 | 40.79 | 59.1 |
| 12 Mesh | 104.0 | 398.0 | 20.90 | 80.0 |
| 14 Mesh | 59.9 | 457.9 | 12.04 | 92.0 |
| Pan (−14 Mesh) | 39.8 | 497.7 | 8.00 | 100.0 |
| ADDITIONAL PRIOR ART ANALYSES | | | | |
| 6 Mesh | 0 | 0 | 0 | 0 |
| 8 Mesh | 88.3 | 88.3 | 18.13 | 18.1 |
| 10 Mesh | 199.7 | 288.0 | 41.00 | 59.1 |
| 12 Mesh | 95.6 | 383.6 | 19.63 | 78.8 |
| 14 Mesh | 58.5 | 442.1 | 12.01 | 90.8 |
| −14 Mesh | 45.0 | 487.1 | 9.24 | 100.0 |
| 6 Mesh | 0 | 0 | 0 | 0 |
| 8 Mesh | 111.5 | 111.5 | 24.27 | 24.3 |
| 10 Mesh | 212.2 | 323.7 | 46.18 | 70.4 |
| 12 Mesh | 80.4 | 404.1 | 17.50 | 87.9 |
| 14 Mesh | 36.5 | 440.6 | 7.94 | 95.9 |
| −14 Mesh | 18.9 | 459.5 | 4.11 | 100.0 |

Following is an analysis of catalysts prepared by weighing out portions of particles retained on baskets of given mesh size:

| Mesh | Weight, Grams | Cumulative Weight, Gms. | % on Mesh | Cumulative, % |
|---|---|---|---|---|
| SAMPLE NO. 2 | | | | |
| 6 | 0 | 0 | 0 | 0 |
| 8 | 60 | 60 | 50 | 50 |
| 10 | 30 | 90 | 25 | 75 |
| 12 | 15 | 105 | 12.5 | 87.5 |
| 14 | 15 | 120 | 12.5 | 100.0 |
| SAMPLE NO. 3 | | | | |
| 6 | 0 | 0 | 0 | 0 |
| 8 | 15 | 15 | 12.5 | 12.5 |
| 10 | 15 | 30 | 12.5 | 25 |
| 12 | 30 | 60 | 25 | 50 |
| 14 | 60 | 120 | 50 | 100 |
| SAMPLE NO. 4 | | | | |
| 6 | 0 | 0 | 0 | 0 |
| 8 | 30 | 30 | 25 | 25 |
| 10 | 30 | 60 | 25 | 50 |
| 12 | 30 | 90 | 25 | 75 |
| 14 | 30 | 120 | 25 | 100 |

We claim:

1. A process for making a cobalt oxide catalyst comprising heating a substance from which cobalt oxide can be formed to a first elevated temperature sufficient to decompose said substance and produce a first porous mass of cobalt oxide, saturating the porous mass with a concentrated aqueous solution of cobalt nitrate, heating the resulting saturated mass at a second elevated temperature for a period of time sufficient to complete the reaction and produce a second porous mass of cobalt oxide having improved crushing strength, and grinding the second porous mass to produce a particulate cobalt oxide catalyst having high activity and improved resistance to disintegration during ammonia oxidation.

2. The process of claim 1 wherein cobalt compounds used in the process are derived from electrolytic grade cobalt containing less than 100 ppm iron.

3. The process of claim 1 wherein said substance from which cobalt oxide can be formed is selected from the group consisting of cobaltous nitrate and basic cobaltous carbonate.

4. The process of claim 1 wherein said substance from which cobalt oxide can be formed is basic cobaltous carbonate.

5. The process of claim 1 wherein said concentrated solutions of cobalt nitrate used in the saturating step contains at least about 8 percent cobalt.

6. The process of claim 1 wherein said first elevated temperature is in the range 200° C. to 800° C.

7. The process of claim 1 wherein said first elevated temperature is in the range 400° C. to 600° C.

8. The process of claim 1 wherein said second elevated temperature is in the range 350° C. to 800° C.

9. The process of claim 1 wherein said second elevated temperature is in the range 450° C. to 750° C.

10. The process of claim 1 wherein said second porous mass of cobalt oxide is ground to produce a particulate cobalt oxide catalyst in the form of irregular particles of length and mean diameter about equal and in the range 1.4 to 4.0 mm.

* * * * *